May 8, 1928.  1,669,232
A. F. DEUEL
STABILIZER
Filed July 14, 1926
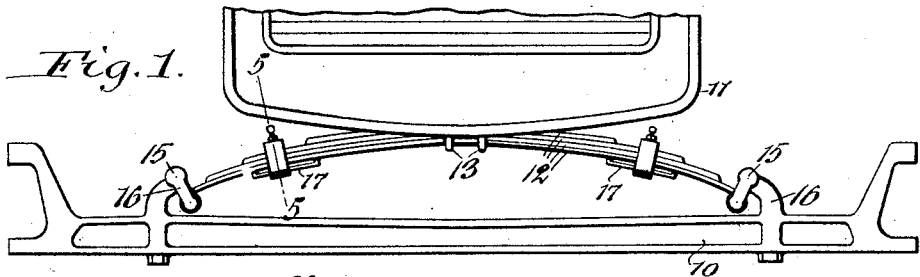
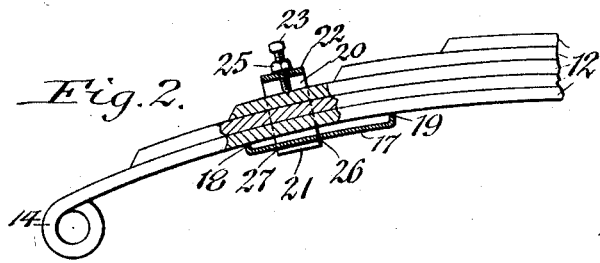
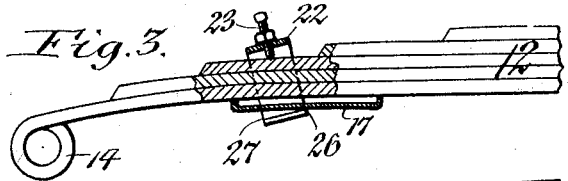
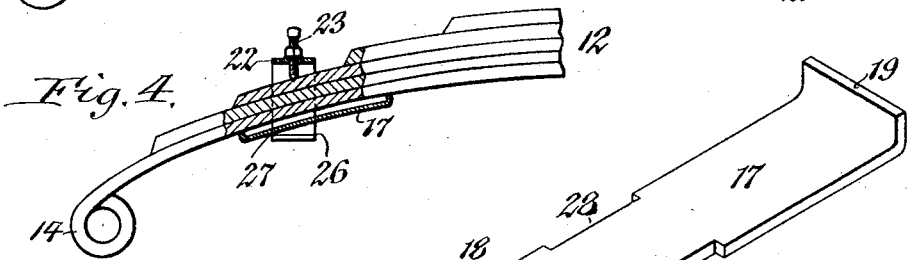
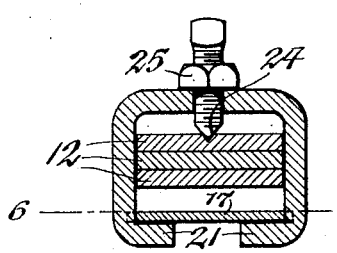
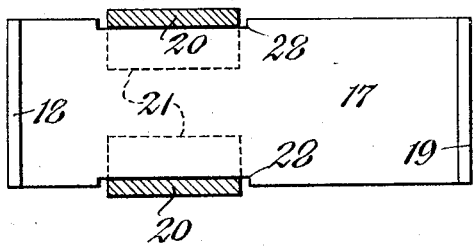
Inventor
Albert Franklyn Deuel
By Popp & Powers
Attorneys Patented May 8, 1928.

1,669,232

UNITED STATES PATENT OFFICE.

ALBERT FRANKLYN DEUEL, OF BUFFALO, NEW YORK, ASSIGNOR TO WILLIAM F. EMERSON, OF BUFFALO, NEW YORK.

STABILIZER.

Application filed July 14, 1926. Serial No. 122,313.

This invention relates to a stabilizer which is more particularly intended for use on the main spring of an automobile which is composed of a plurality or group of spring leaves and commonly known as a multiple leaf spring.

It is the object of this invention to provide a stabilizer which is applied to a multiple leaf spring of this character which is very compact and simple in construction, which is readily applicable to the standard forms of such springs now commonly found on automobiles of standard construction, and which is sightly in appearance and efficient in operation.

To that end this invention consists, generally, in the application of an auxiliary spring to the main spring of an automobile by means of a yoke which is so organized that when the main multiple leaf spring is deflected from its normal bowed position to a more or less flattened position, a comparatively moderate yielding pressure will be applied to the main spring for pressing its leaves together and thus moderately resist the deflection of this main spring by increasing the frictional contact between the multiple leaves and increasing the resistance to their movement lengthwise relative to each other, and when the main spring rebounds from its normal position, so as to increase the extent of its bowed formation, such as occurs when a spring re-bounds after being depressed, then this stabilizer acts to apply a yielding pressure of greater force against the multiple spring than that which was exerted when flattening the spring and thereby produces a relatively greater frictional engagement between the leaves of the spring and a correspondingly increased resistance against the sliding of these spring leaves one upon the other, whereby the shock to which the car may be subjected is cushioned in accordance with the load imposed upon the same.

In the accompanying drawings:

Figure 1 is a fragmentary front elevation of an automobile showing the stabilizer embodying my invention applied to the main multiple leaf spring which is interposed between the front axle and the front part of the car body.

Figure 2 is a fragmentary elevation, partly in section, of the main multiple spring equipped with my improved stabilizer and showing the position which these parts occupy when the main spring is in its normal position.

Figure 3 is a similar view showing the relative position of the parts when the main spring is depressed or flattened to a greater extent as compared with its normal position.

Figure 4 is a similar view showing the relative position of the parts when the main spring is bowed to a greater extent compared with its normal position.

Figure 5 is a vertical cross-section on an enlarged scale, taken on line 5—5 Fig. 1.

Figure 6 is a horizontal section taken on the correspondingly numbered line in Fig. 5.

Figure 7 is a detached perspective view of the yoke forming part of the stabilizer containing my invention.

Figure 8 is a similar view of the auxiliary spring constituting part of my improved stabilizer.

Similar characters of reference indicate like parts in the several figures of the drawings:—

The numeral 10 represents the front axle of an automobile, 11 the front portion of the body of the same, and 12 the plurality of superposed spring leaves which constitute the main spring and which are connected midway of their length, with each other and with the car body by means of clips 13, while the extremities of the longest or lower spring are provided with eyes 14 which are connected by means of shackles or swinging links 15, with the supporting lugs 16 rising from the axle in a well-known manner.

My improved stabilizer is applicable to this main spring at the free ends of some of its leaves, preferably the three longest leaves of the group constituting the main spring, and in the preferred construction two of such stabilizers are applied to each main spring between opposite sides of its central part and the extremities of the same. The following description therefore, to one of these stabilizers will apply to all applications of the same.

In its general organization this stabilizer comprises an auxiliary spring member which is applied to the outer side of the longest leaf of the main spring; and a yoke which bears against the outer side of this auxiliary spring and also engages with the opposite outer side of the respective shorter leaf of the main spring, which parts are so organized that when the main spring is deflected from its normal bowed position to a more or less flattened position, the tension upon this auxiliary spring will be only moderately increased, while upon flexing this main spring out of its normal position into an increased bowed position, the tension upon the auxiliary spring will be greater than that which was produced during the flattening of the main spring.

In the preferred construction, the auxiliary spring consists of a flat or leaf-shaped body 17 which is made of suitable resilient material such as spring steel, and has its opposite ends projecting inwardly for engagement with the outer side of the longest leaf of the main spring, and thereby hold the central part of the auxiliary spring in spaced relation from this long leaf. For this purpose the body 17 of the auxiliary spring is provided with inwardly projecting lugs 18, 19 which are formed integrally with the body 17 and which upon engaging the outer surface of the longest main spring leaf, operate to hold the body 17 of the auxiliary spring away from this long leaf, as clearly shown in Figs. 1 to 5.

The yoke whereby this auxiliary spring is held in place may be variously constructed, but in the preferred form shown in the drawings, the same comprises two upright side bars 20, which are arranged along the opposite longitudinal edges of some of the longer leaves of the main spring, preferably the longest three, two inwardly projecting lugs 21—21 engaging with the underside of the body 17 of the auxiliary spring; a cross bar 22 connecting the upper ends of the side bars 20—20; and a screw 23 working in a threaded opening in the cross bar 22 and engaging its lower end with the top of the respective leaf of the main spring, which in this instance is the third longest.

By turning the screw 23, the tension upon the auxiliary spring may be adjusted as desired, and to prevent this screw from slipping on the respective leaf of the main spring, the screw is provided at its inner end with a comparatively sharp point 24, which embeds itself in the outer surface of the main spring leaf and thereby prevents creeping of the upper part of the yoke on the main spring. Loosening of this bolt when subjected to the vibration of the car is prevented by means of a jamb nut 25 applied thereto and bearing against the upper surface of the cross bar 22 as shown in Figs. 1 to 5.

The yoke is applied to the auxiliary spring so that its lugs 21—21 engage with the body thereof nearer one of the bearing lugs of the auxiliary spring than the other, and in the preferred organization these lugs 21—21 of the yoke are engaged with the body 17 of the auxiliary spring near the outer lug 18 which is next to the free end of the longest leaf of the main spring; in other words, that end of the longest leaf which is connected by means of a shackle with the axle as shown in Fig. 1.

As there shown, the corners 26 at that edge of the lugs 21—21 nearest the center of the main spring engage with the central part of the auxiliary spring 17, and the opposite corners 27 of these lugs engage with the outer side of the auxiliary spring body 17 at a point between the center of this spring body 17 and its outer lug 18. This relation of these parts is maintained by loosely interlocking the same and this is preferably accomplished by providing opposite longitudinal edges of the auxiliary spring body 17 with notches 28 which receive the side bars 20—20 of the yoke.

When the spring is in its central or normal position, the yoke is arranged substantially at right angles to the main spring leaves; and the lugs 21—21 of the same engage throughout their entire length with the under or outer side of the spring body 17, as best shown in Fig. 2, at which time the auxiliary spring is only under the initial tension put into the same when assembling the parts for use, and therefore exerts the minimum effect for yieldingly holding together the free ends of those leaves of the main spring which are embraced by the auxiliary spring and the yoke. At this time, only a comparatively small increase in the frictional resistance between the leaves of the main spring is produced at the free ends thereof, so that the main spring is free to function with ease and enable the passengers to ride comfortably over comparatively smooth roads without any interference from the stabilizer.

When the main spring is depressed out of its normal bowed position so that its leaves are flattened more or less as shown in Fig. 3, the free ends of the longest three leaves move outwardly from the point of attachment of the main spring to the body of the car, whereby the clamping bolt 23 is also carried longitudinally outward and causes the yoke to rock relative to the main spring and the auxiliary spring. During this rocking action the yoke turns upon the near corners 26 of the lugs 21—21 on the central part of the auxiliary spring body 17, while the far corners 27 of the same are disengaged from this auxiliary spring body 17, as shown in Fig. 3. As a result of this action of the yoke, the body 17 of the auxiliary spring is flexed toward the underside of the longest leaf of the main spring to a moderate extent, so that the longer leaves of the main spring are pressed together more tightly for increasing the frictional contact between the same, and an increased resistance is thereby produced against the longitudinal creeping of these springs relatively to each other, so that a corresponding absorption of the shock to which the car is subjected occurs at this time.

When the main spring re-bounds after such flattening deflection and assumes a bowed position of a greater degree than that which it normally occupies, the outer or free ends of the main spring are drawn together toward the center or anchored point of the main spring. This causes the leaves of the main spring to creep lengthwise upon each other in the opposite direction so that the top of the yoke, which bears by means of screw 23 on one of the leaves which is shorter than the longest, will be rocked inwardly and cause the yoke to turn with its far corners 27 as a fulcrum, on the underside of the auxiliary spring body 17, while the near corners 26 thereof are moved out of engagement from the underside of this spring body, as shown in Fig. 4. Owing to the inward pressure of this rocked yoke during such rocking action being at this time brought to bear against the underside of the auxiliary spring body 17 comparatively close to its far bearing lug 18, this auxiliary spring offers a greater resistance to the rocking action of the yoke because the auxiliary spring is stiffer near this far bearing lug 18 than it is at the center of the body 17.

It follows from this that the particular spring leaves of the main spring are at this time pressed together with much greater force than when the main spring was flattened and that such greater force operates to press the respective leaves of the main spring together with such increased friction that a greater resistance is offered to the longitudinal sliding movement of the respective main spring leaves upon each other, and a greater cushioning effect is produced for absorbing to a greater extent, the larger load or shock to which the main spring is subjected during re-bound. By this means the stabilizer operates to introduce small increase in the resistance to the sliding action of the main spring leaves upon each other during depression of the main spring into a more or less flattened position and considerably greater increase in the resistance of such movements when the main spring is deflected to an increased bowed position from its normal position thereby automatically adjusting the resistance to the movement of the main spring leaves relatively to each other in accordance with the variation in the load or shock to which the same are subjected.

It will be noted that in the operation of this stabilizer, the clamping bolt 23 forms a single bearing against one side of the main spring while the far and near corners 26 and 27 of the lugs of the yoke form spaced bearings which are adapted to bear either simultaneously or independently against the opposite side of the main spring, depending upon whether the main spring is in its normal position or whether the same has been deflected to a more or less flattened or bowed position out of its normal or central position.

In addition to operating very effectively to absorb the shock on an automobile under varying conditions, this stabilizer is so organized that it does not detract from the appearance of the automobile, it has comparatively few parts which can be produced at low cost, and the same is not liable to get out of order after being properly installed.

I claim:

1. A stabilizer for a main spring composed of multiple superposed leaves, comprising an auxiliary leaf spring arranged adjacent to one side of said main spring and provided with inwardly projecting bearings which engage with the adjacent leaf of said main spring and a yoke which is adapted to rock lengthwise of the main spring and having a part adapted to engage with one side of said main spring and another part adapted to engage different points thereof with the opposite side of said auxiliary spring upon rocking the yoke relatively to the main spring.

2. A stabilizer for a main spring composed of multiple superposed leaves, comprising an auxiliary leaf spring arranged adjacent to one side of said main spring and provided with inwardly projecting bearings which engage with the adjacent leaf of said main spring and a yoke adapted to rock lengthwise of the main spring and having a part which bears at a single bearing against one side of the main spring and another part having spaced bearings adapted to bear either simultaneously or individually against the opposite side of said auxiliary spring.

3. A stabilizer for a main spring composed of multiple superposed leaves, comprising an auxiliary leaf spring arranged adjacent to one side of said main spring and provided with inwardly projecting bearings which engage with the adjacent leaf of said main spring and a yoke adapted to rock lengthwise of the main spring and having a part which bears at a single bearing against one side of the main spring and another part having spaced bearings adapted to bear either simultaneously or individually against the opposite side of said auxiliary spring, one of said spacing bearings being arranged adjacent to the center of said auxiliary leaf spring and the other being arranged adjacent to one end of said auxiliary leaf spring.

4. A stabilizer for a main spring composed of multiple superposed leaves, comprising an auxiliary leaf spring arranged adjacent to one side of said main spring and provided with inwardly projecting bearings which engage with the adjacent leaf of said main spring and a yoke adapted to rock lengthwise of the main spring and having a part which bears at a single bearing against one side of the main spring and another part having spaced bearings adapted to bear either simultaneously or individually against the opposite side of said auxiliary spring, one of said spacing bearings being arranged adjacent to the center of said auxiliary leaf spring and the other being arranged adjacent to one end of said auxiliary leaf spring, said yoke having a body composed of two side bars, a cross bar connecting two corresponding ends of said side bars, and two lugs projecting inwardly from the opposite ends of said side bars and forming the spaced bearings thereof, and a screw mounted on said cross bar and forming said single bearing.

5. A stabilizer for a main spring composed of multiple superposed leaves, comprising an auxiliary leaf spring arranged adjacent to one side of said main spring and provided with inwardly projecting bearings which engage with the adjacent leaf of said main spring and a yoke adapted to rock lengthwise of the main spring and having a part which bears at a single bearing against one side of the main spring and another part having spaced bearings adapted to bear either simultaneously or individually against the opposite side of said auxiliary spring, one of said spacing bearings being arranged adjacent to the center of said auxiliary leaf spring and the other being arranged adjacent to one end of said auxiliary leaf spring, said yoke having a body composed of two side bars, a cross bar connecting two corresponding ends of said side bars, and two lugs projecting inwardly from the opposite ends of said side bars and forming the spaced bearings thereof, and a screw mounted on said cross bar and forming said single bearing and provided with a pointed end adapted to engage said main spring.

6. A stabilizer for a main spring composed of multiple superposed leaves, comprising an auxiliary leaf spring arranged adjacent to one side of said main spring and provided with inwardly projecting bearings which engage with the adjacent leaf of said main spring and a yoke adapted to rock lengthwise of the main spring and having a part which bears at a single bearing against one side of the main spring and another part having spaced bearings adapted to bear either simultaneously or individually against the opposite side of said auxiliary spring, one of said spacing bearings being arranged adjacent to the center of said auxiliary leaf spring and the other being arranged adjacent to one end of said auxiliary leaf spring, said yoke having a body comprising two side bars provided at two corresponding ends with the spaced bearings engaging with one side of said auxiliary spring and a cross bar connecting the opposite ends of said side bars and provided with the single bearing engaging with the opposite side of the main spring, and said auxiliary spring being provided in its opposite edges with notches which receive said side bars.

In testimony whereof I, hereby affix my signature.

ALBERT FRANKLYN DEUEL.